(12) United States Patent
Blanchet et al.

(10) Patent No.: US 7,808,371 B2
(45) Date of Patent: Oct. 5, 2010

(54) VEHICLE FLEET SECURITY SYSTEM

(75) Inventors: Robert Blanchet, Québec (CA); Marc-André Beliveau, Saint-Jérôme (CA)

(73) Assignee: 2862-8030 Quebec Inc., Repentigny, Quebec (CA)

( * ) Notice: Subject to any disclaimer, the term of this patent is extended or adjusted under 35 U.S.C. 154(b) by 220 days.

(21) Appl. No.: 11/865,996

(22) Filed: Oct. 2, 2007

(65) Prior Publication Data

US 2008/0079551 A1    Apr. 3, 2008

Related U.S. Application Data

(60) Provisional application No. 60/848,635, filed on Oct. 3, 2006.

(51) Int. Cl.
*B60R 25/10* (2006.01)

(52) U.S. Cl. .................. 340/426.1; 340/5.74; 700/26; 701/29

(58) Field of Classification Search ............. 340/426.1, 340/425.5, 500, 539.24, 825.31, 5.74, 5.8; 700/26; 701/29
See application file for complete search history.

(56) References Cited

U.S. PATENT DOCUMENTS

| | | | |
|---|---|---|---|
| 3,618,067 A | 11/1971 | De Vale et al. | |
| 3,988,724 A | 10/1976 | Anderson | |
| 4,177,466 A | 12/1979 | Reagan | |
| 4,818,998 A | 4/1989 | Apsell et al. | |
| 4,908,629 A | 3/1990 | Apsell et al. | |
| 4,990,890 A | 2/1991 | Newby | |
| 5,319,698 A | 6/1994 | Glidewell et al. | |
| 5,400,018 A | 3/1995 | Scholl et al. | |
| 5,596,261 A | 1/1997 | Suyama | |
| 5,612,668 A | 3/1997 | Scott | |
| 5,635,693 A | 6/1997 | Benson et al. | |

(Continued)

FOREIGN PATENT DOCUMENTS

EP    0894973    2/1999

(Continued)

OTHER PUBLICATIONS

Kolombo Brochure [online]. Kolombo Technologies Ltée—[retrieved on Aug. 20, 2007]. Retrieved from the Internet: <URL:www.systemekolombo.com/Brochure-Kolombo-eng.pdf>.

*Primary Examiner*—Davetta W Goins
*Assistant Examiner*—Edny Labbees
(74) *Attorney, Agent, or Firm*—BCF LLP

(57) ABSTRACT

The invention relates to a fleet security system comprising a vehicle security unit (VSU) to be installed inside each vehicle, on the sun visor or on the dashboard of the vehicle, and connected to the vehicle using the On-Board Diagnostics (OBD) connector of the vehicle. An authorized user holds the key of the vehicle to be used and an electronic security key. When the authorized user opens the door of the vehicle, the VSU detects a disturbance in the vehicle and wirelessly sends a disturbance event message to a fleet master unit. The authorized user then has a given deactivation time period (such as thirteen seconds) to show its security key to a key reader located inside the vehicle, on the VSU. The security key code is validated by the master unit which will command the VSU to disarm its disturbance detection.

8 Claims, 9 Drawing Sheets

U.S. PATENT DOCUMENTS

| | | | |
|---|---|---|---|
| 5,660,246 A | 8/1997 | Kaman | |
| 5,704,008 A | 12/1997 | Duvall, Jr. | |
| 5,705,929 A | 1/1998 | Caravello et al. | |
| 5,708,417 A * | 1/1998 | Tallman et al. | 340/539.23 |
| 5,801,618 A * | 9/1998 | Jenkins | 340/426.14 |
| 5,838,251 A * | 11/1998 | Brinkmeyer et al. | 340/5.22 |
| 5,917,423 A | 6/1999 | Duvall | |
| 6,229,988 B1 | 5/2001 | Stapefled et al. | |
| 6,263,268 B1 | 7/2001 | Nathanson | |
| 6,424,157 B1 | 7/2002 | Gollomp et al. | |
| 6,531,955 B1 | 3/2003 | Brendzel et al. | |
| 6,584,403 B2 | 6/2003 | Bunn | |
| 6,611,232 B1 | 8/2003 | Wunderlich et al. | |
| 6,732,031 B1 | 5/2004 | Lightner et al. | |
| 6,809,636 B2 | 10/2004 | Metlitzky et al. | |
| 6,870,458 B2 | 3/2005 | Caren | |
| 6,898,493 B2 * | 5/2005 | Ehrman et al. | 701/35 |
| 6,957,133 B1 | 10/2005 | Hunt et al. | |
| 6,960,990 B2 * | 11/2005 | McKibbon | 340/426.35 |
| 7,015,792 B2 | 3/2006 | Lessard et al. | |
| 7,091,821 B2 | 8/2006 | Lessard et al. | |
| 7,225,065 B1 | 5/2007 | Hunt et al. | |
| 7,228,211 B1 | 6/2007 | Lowrey et al. | |
| 7,233,227 B2 * | 6/2007 | Lemoult | 340/5.62 |
| 7,246,744 B2 * | 7/2007 | O'Brien et al. | 235/382 |
| 2002/0153418 A1 | 10/2002 | Maloney | |
| 2002/0184062 A1 * | 12/2002 | Diaz | 705/7 |
| 2003/0022809 A1 * | 1/2003 | Weuthen et al. | 510/445 |
| 2003/0034873 A1 * | 2/2003 | Chase et al. | 340/5.2 |
| 2003/0169150 A1 | 9/2003 | Brendzel et al. | |
| 2004/0128159 A1 | 7/2004 | McGinn et al. | |
| 2005/0177288 A1 | 8/2005 | Sullivan et al. | |
| 2005/0206502 A1 | 9/2005 | Bernitz | |
| 2005/0212521 A1 | 9/2005 | Bertness | |
| 2006/0022809 A1 | 2/2006 | Lessard et al. | |
| 2006/0284476 A1 * | 12/2006 | Choucair et al. | 303/7 |

FOREIGN PATENT DOCUMENTS

| | | |
|---|---|---|
| GB | 2253930 | 9/1992 |
| GB | 2272787 | 5/1994 |

* cited by examiner

VEHICLE FLEET SECURITY SYSTEM

CROSS-REFERENCE TO RELATED APPLICATIONS

This application claims priority under 35 USC §119(e) of U.S. provisional patent application(s) 60/848,635 filed Oct. 3, 2006, the specification(s) of which being hereby incorporated by reference.

TECHNICAL FIELD

The invention relates to a security system for a fleet of vehicles. More particularly, the invention relates to a system for monitoring activities related to each vehicle of a fleet using a vehicle security unit installed inside each vehicle and communicating with a fleet master unit.

BACKGROUND OF THE ART

A vehicle fleet security system can be used by dealers, car rental companies, delivery service companies or other entities having a large number of vehicles to manage, for monitoring, tracking and controlling access to the vehicles of the fleet, and for providing an anti-thief security system for their fleet of vehicles while the vehicles are located in the fleet parking lot.

Some fleet security systems use a nearly standalone security unit installed in each vehicle. Whenever an intrusion event occurs, the unit activates an alarm on the vehicle, such as an alarm siren, and also transmits an alarm signal to a base station which sets an alarm accordingly.

Other fleet security systems also deal with controlling the access to the vehicles. For example, a vehicle security unit (VSU) may be installed outside each vehicle for direct access to it by an authorized person. The VSU contains the key of its associated vehicle and the authorized person may obtain the key by presenting an identification tag to a reader on the VSU. The VSU then opens the key box so that the authorized person can take the key to access the vehicle. The security system is typically disarmed during business hours such that no alarm is generated when an authorized person enters the vehicle.

Other fleet security systems use a hidden disarming switch inside the vehicle such that any person aware of the presence of the VSU and of the location of the hidden switch can use the vehicle without activating an alarm.

Most vehicle security systems require a complex installation on the vehicle, requiring modifications to the vehicle. A convenient and easy-to-install fleet security system would therefore be of interest.

SUMMARY

The invention relates to a fleet security system comprising a vehicle security unit (VSU) to be installed inside each vehicle, such as on the sun visor or on the dashboard of the vehicle, and connected to the vehicle using the On-Board Diagnostics (OBD) connector of the vehicle. An authorized user holds the key of the vehicle to be used and an electronic security key. When the authorized user opens the door of the vehicle, the VSU detects a disturbance in the vehicle and wirelessly sends a disturbance event message to a fleet master unit located in the car dealer building, for example. The authorized user then has a given deactivation time period (such as thirteen seconds) to show its security key to a key reader located inside the vehicle, on the VSU. The security key code is validated by the master unit which will command the VSU to disarm its disturbance detection.

One aspect of the invention provides a vehicle security unit for installation inside a vehicle of a fleet of vehicles and in wireless communication with a master unit. The vehicle is associated with a vehicle identification code. The vehicle security unit comprises an armed mode to be active or inactive; a disturbance event detection system for detecting a disturbance event associated with the vehicle; a security key reader for reading a security key, and for producing a security key reading event in response to the reading, the security key having a key identification code; and a vehicle transmitter for transmitting a disturbance event message to the master unit in response to the disturbance event if the security mode is active and for transmitting a security key event message to the master unit in response to the security key reading event, the disturbance event message and the security key event message comprising the vehicle identification code and the security key event message comprising the key identification; and a receiver for receiving a command from the master unit to deactivate the armed mode.

Another aspect of the invention provides a security system for a fleet of vehicles. The security system comprises: a vehicle security unit for installation inside a passenger compartment of at least one of the vehicles, and a master unit in wireless communication with the vehicle security unit. Each one of the vehicles is associated with a vehicle identification code. Each vehicle security unit has: an armed mode to be active or inactive; a disturbance event detection system for detecting a disturbance event associated with the vehicle; a security key reader for reading a security key, and for producing a security key reading event in response to the reading, the security key having a key identification code; and a vehicle transceiver for transmitting a disturbance event message in response to the disturbance event if the security mode is active and for transmitting a security key event message in response to the security key reading event, the disturbance event message and the security key event message comprising the vehicle identification code and the security key event message comprising the key identification, and for receiving a command to deactivate the armed mode. The master unit has: a master transceiver for receiving the disturbance event message and the security key event message, and for sending the command to the vehicle security unit; a processing module in communication with the master transceiver and for validating the security key identification code when receiving a security key event message, for determining the command to deactivate the armed mode if the identification code is valid, the command to be sent using the master transceiver, and for activating an alarm flag when receiving the disturbance event message a predetermined deactivation time period following the receiving if the armed mode is active.

Another aspect of the invention provides a vehicle security unit for installation in a vehicle of a fleet of vehicles and in wireless communication with a master unit. The vehicle is associated with a vehicle identification code and has an on-board diagnostic connector and a battery. The vehicle security unit comprises: a disturbance event detection system for detecting a disturbance event associated with the vehicle and comprising an on-board diagnostic input to be connected to the on-board diagnostic connector for detecting at least a voltage drop event in the battery, the disturbance event comprising the voltage drop event; a security key reader for reading a security key, and for producing a security key reading event in response to the reading, the security key having a key identification code; and a vehicle transmitter for transmitting a disturbance event message to the master unit in response to the disturbance event and for transmitting a security key event message to the master unit in response to the security key reading event, the disturbance event message and the security key event message comprising the vehicle identification code and the security key event message comprising the key identification.

BRIEF DESCRIPTION OF THE DRAWINGS

It will be noted that throughout the appended drawings, like features are identified by like reference numerals.

DETAILED DESCRIPTION

Figure 1:
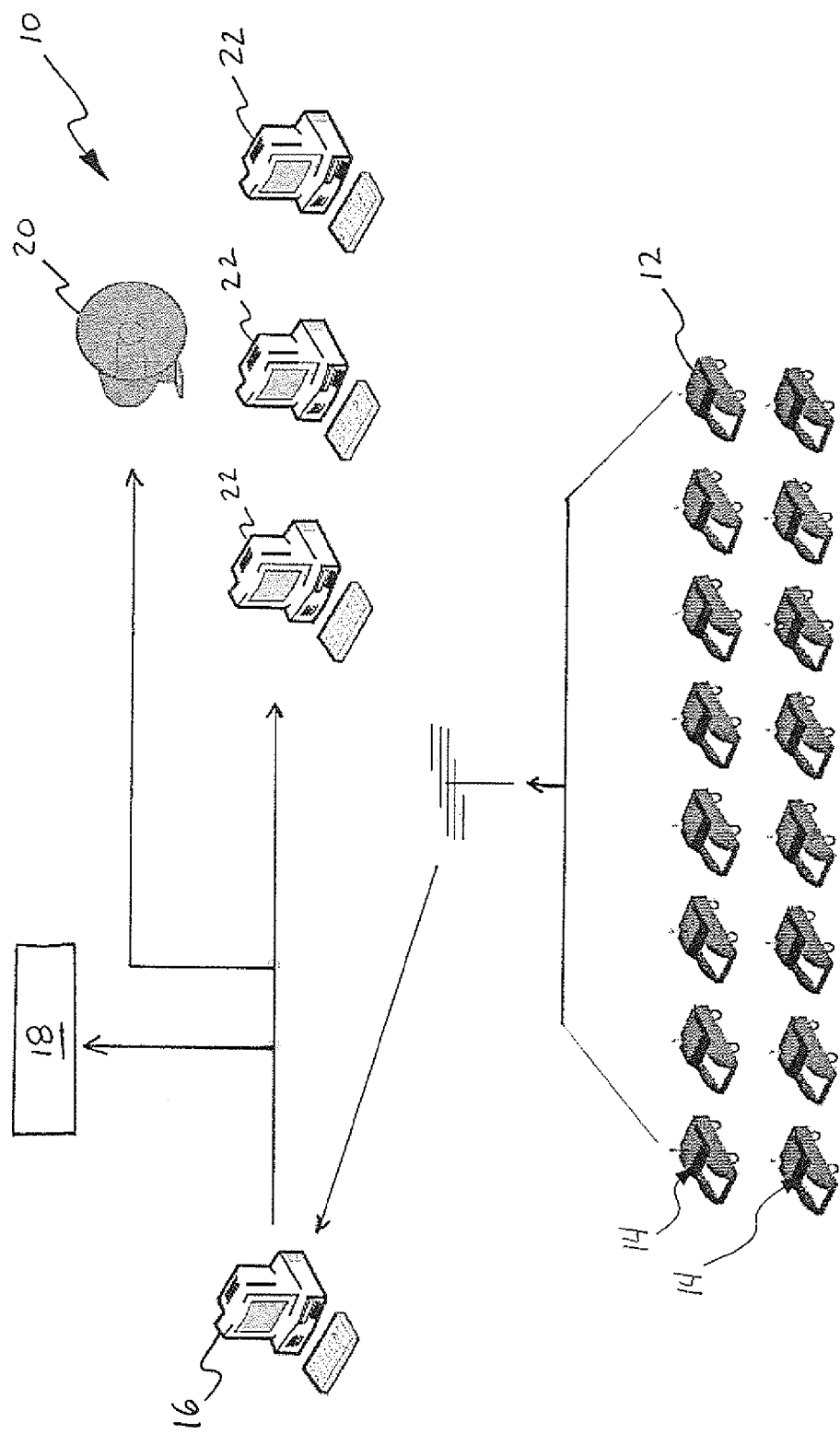
FIG. 1 is a schematic of a fleet security system.

The invention provides a fleet security system comprising a vehicle security unit (VSU) to be installed inside each vehicle, such as on the sun visor of the vehicle, and connected to the vehicle using the On-Board Diagnostics (OBD) connector of the vehicle. An authorized user holds the key of the vehicle to be used and an electronic security key. When the authorized user opens the door of the vehicle, the VSU detects a disturbance in the vehicle and wirelessly sends a disturbance event message to a fleet master unit located in the car dealer building, for example. The authorized user then has a given deactivation time period (such as thirteen seconds) to show its security key to a key reader located inside the vehicle, on the VSU. The master unit receives the key identification code and validates it. If the key identification code is valid, the master unit sends a command to the VSU to go in a disarmed mode wherein the disturbance event detector is deactivated and no event messages are sent to the master unit. When the authorized person returns the vehicle to the parking lot, he or she simply locks the doors of the vehicle and the VSU automatically goes in an armed mode when no disturbance event has occurred for a given activation time period (such as thirty seconds). The user is thus not required to arm the security system and an employee thus cannot make the mistake of forgetting to arm the security system.

However, when the vehicle leaves the parking lot, the VSU is rearmed in the case of inactivity in the vehicle for more than thirty seconds, i.e. if the authorized person leaves the vehicle for more then thirty seconds. As it does not have any authority to disarm itself and as it is out of range of the master unit, the VSU will then stay in the armed mode. Consequently, the VSU will transmit all new events detected. As the VSU goes out of reach of the vehicle, it stops receiving acknowledgements from the fleet master unit. As a consequence, it retries to send the disturbance event message for two more times. As an acknowledgement is still not received, it goes back to the beginning of the armed mode and will not retry to send this specific event anymore. Furthermore, when the vehicle re-enters the parking lot, the master unit recognizes that this specific VSU was deactivated by an authorized user. The master unit then ignores all events received from this VSU until it is reactivated after thirty seconds of inactivity.

In order to keep an up-to-date inventory of the vehicles of the fleet, each VSU periodically sends a presence message to the master unit which keeps track of the inventory. Simultaneously, according to a list of the vehicles that are expected to be in the fleet (i.e. VSU armed), the master unit checks if all vehicles of the list are present in the fleet. When no presence message is received from a vehicle that should be armed for more than a given missing time period, such as five minutes, the vehicle is identified as missing and a warning flag is activated. An administrator is then informed that one vehicle of the fleet is missing and can access the master unit database to see who was the last person to use the vehicle for example. He may then contact this person to see if an unforeseen event occurred. He may also use the cameras installed in the parking lot or go directly on the spot to check if the vehicle was stolen for example. An appropriate action is then carried out accordingly. The VSU may also comprise a local positioning system (with a covering range of about 5 to 10 km) for locating a missing vehicle in the area around the parking lot or, alternatively, it may comprise a global positioning system for covering a larger area.

Now referring to the drawings, FIG. 1 illustrates a security system 10 for a fleet of vehicles 12. Each vehicle 12 has a vehicle security unit (VSU) 14 installed inside the vehicle 12. The VSU 14 is in wireless connection with a master unit 16 typically located in a building near the parking lot where the vehicles 12 are parked. The master unit 16 controls the disarming of the VSU 14 for access to it by authorized users, and generates an alarm flag upon unauthorized attempts to enter, to lift or to cut the current to the VSU 14. The generated alarm flag typically switches on an alarm siren 20 and contacts an administrator or a security guard or contacts a central monitoring station 18 if the alarm occurred off business hours. The master unit 16 may optionally be networked with work stations 22 that can be used for remotely inputting data and for remotely visualizing alarm flags and historic data regarding the events associated with each vehicle and stored in a database by the master unit 16.

Figure 2:
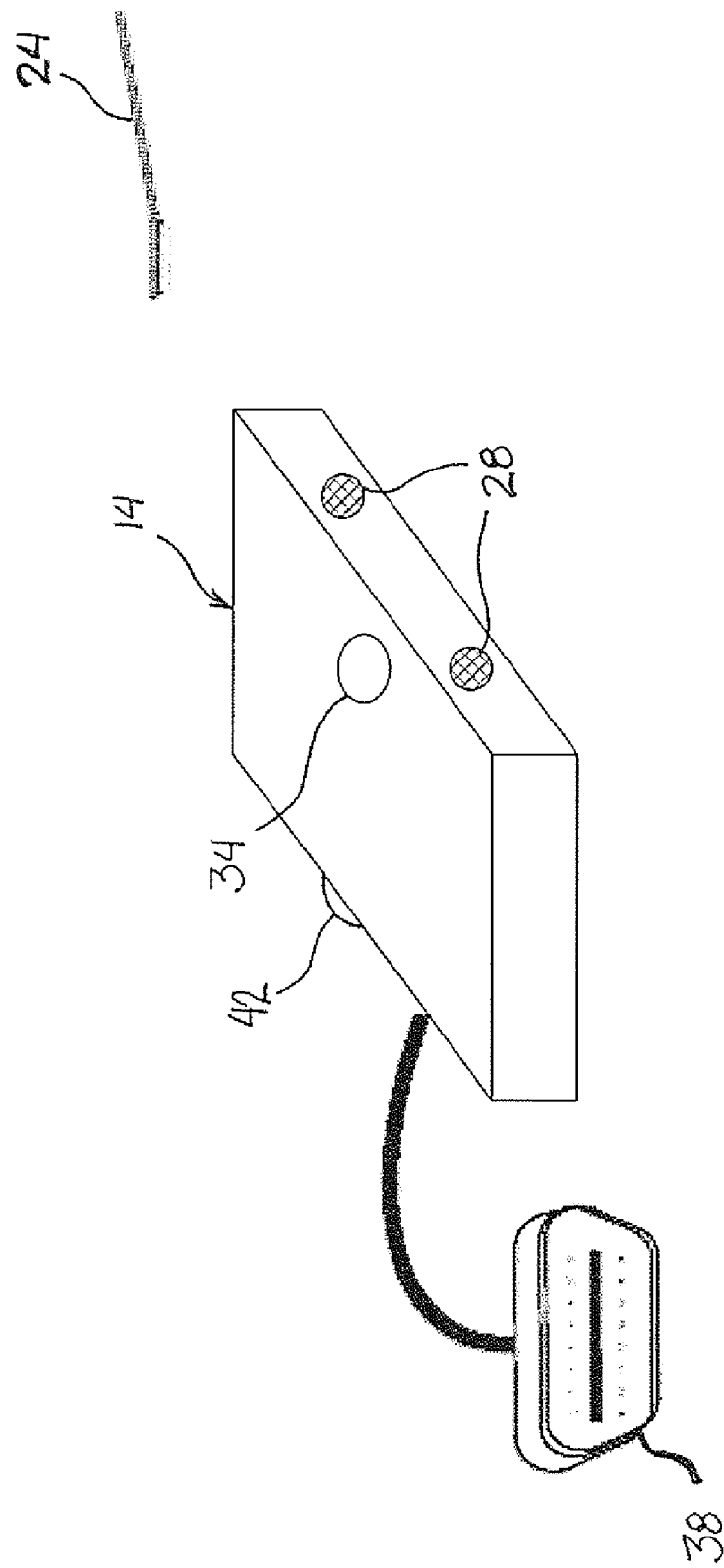
FIG. 2 is a perspective view of a vehicle security unit (VSU) to be installed in each vehicle of the fleet along with a security key.

FIG. 2 illustrates a VSU 14 to be installed in a vehicle 12 (not shown). The VSU 14 is a small device to be installed inside each vehicle of the fleet, on the sun visor or on the dashboard for example. It may be fixed to the sun visor using rubber bands and comprises an On-Board Diagnostics (OBD) input connector 38 to be connected to the vehicle using the OBD output connector of the vehicle, typically an OBD2 (accessible from the passenger compartment, under the dashboard). The OBD connection is used to provide electrical power from the battery of the vehicle, to the VSU 14. It is also used to monitor the voltage level of the battery and to eventually detect an ignition of the car or a power interruption due to, for example, an attempt to disconnect the VSU 14 or the car battery. The VSU 14 also comprises motion detectors 28 for detecting an intrusion in the car. When an intrusion is detected, e.g. someone opens the door of the vehicle, an authorized person has a given deactivation time period for showing its security key 24 to the security key reader 34 located on the VSU 14. If no security key is shown, i.e. there was an unauthorized intrusion, an alarm is activated by the master unit (not shown). The VSU 14 also comprises an alarm indicator 42, typically a super bright light emission diode (LED), used to localize the vehicle that generated an alarm, among the vehicles of the fleet. The alarm indicator 42 provides a light sufficiently bright for easily seeing it a great distance away from the vehicle.

Figure 3:
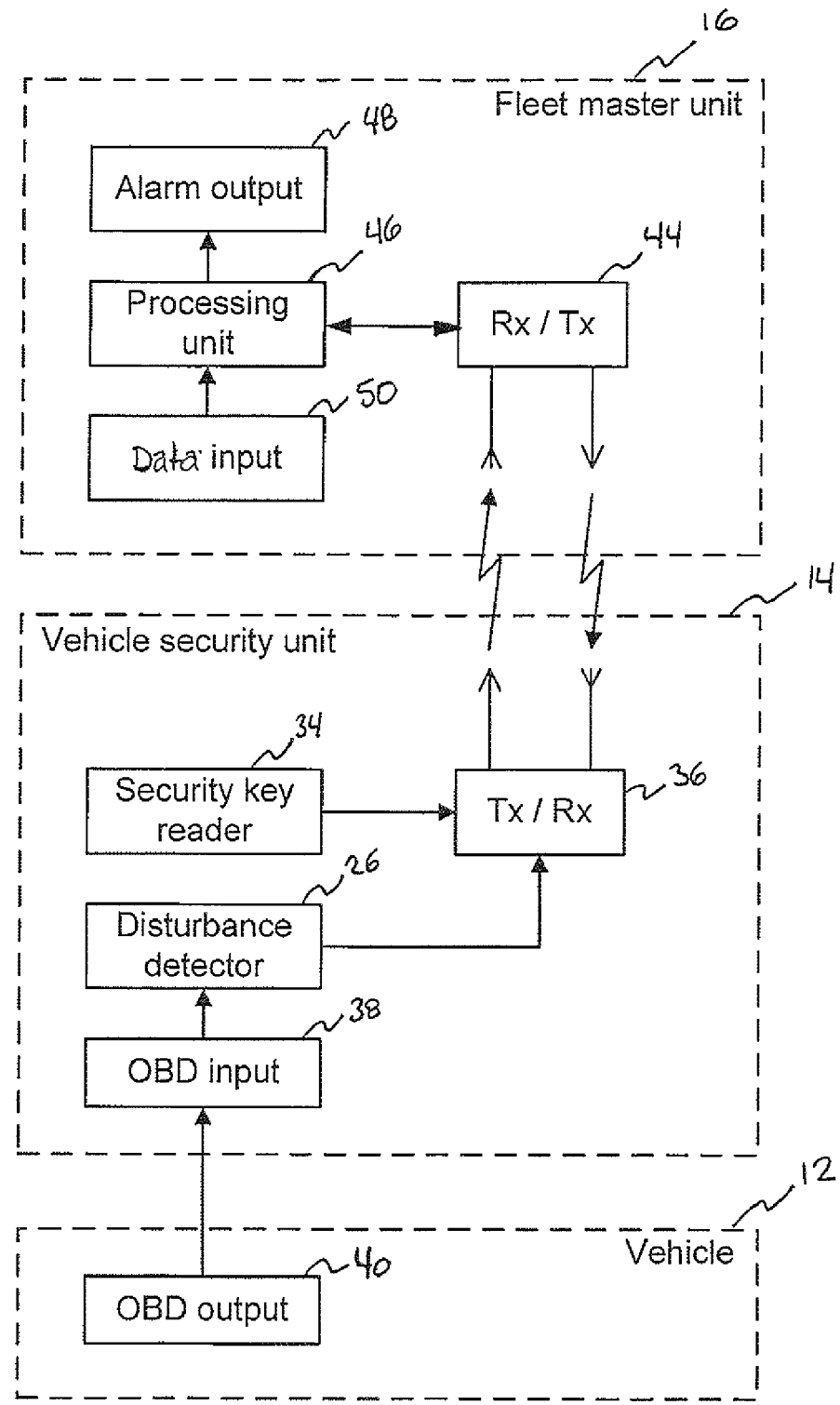
FIG. 3 is a block diagram of the fleet security system wherein the basic electronic components are shown.

FIG. 3 illustrates the main components of the fleet security system 10. The fleet security system 10 comprises a VSU 14 installed in each vehicle 12 of the fleet and in wireless communication with a master unit 16. Each vehicle 12 has a vehicle identification code and an OBD output 40. The VSU 14 has a reset mode, an armed mode, a disarmed mode for using the vehicle, i.e. driving it out of the parking lot, and a maintenance mode, for allowing a technician to conduct maintenance of the vehicle 12, including adding and removing of VSUs. The VSU 14 is electrically powered using an OBD input 38 connected to the OBD output 40 of the vehicle 12. The VSU 14 also comprises a disturbance detector for detecting a disturbance event, such as an intrusion or an attempt to lift the vehicle, associated with the vehicle 12, and a security key reader 34 for reading a security key (not shown). Each security key has a unique key identification code. A key reading produces a key reading event. The VSU 14 comprises a VSU transmitter/receiver 36 for transmitting messages to the master unit 16 when a disturbance event or a key reading event occurs and the VSU 14 is in the armed mode and for receiving commands from the master unit 16. Possible commands include a command to go into the disarmed mode or the maintenance mode or a command to activate or deactivate the alarm indicator. Whenever the VSU 14 sends a disturbance event message, the message includes the type of disturbance event and the vehicle identification code. The vehicle identification code may be a code associated with the VSU 14 which the master unit 16 associates with the given vehicle 12 according to a database. A key reading event comprises the key identification code for validation by the master unit 16.

The master unit 16 is typically a computer such as a workstation comprising a processing unit 46 and a data input 50 such as a keyboard, a floppy drive or a network connection for adding or removing vehicles in the fleet, for associating the VSU 14 identification code to the vehicle 12, for adding or removing security keys and for associating each security key identification code to its user and to a security level. For example, when a vehicle is sold, the associated VSU 14 can be removed and it can be associated to another vehicle when a new vehicle is added to the inventory.

The processing unit 46 is connected to a master transmitter/receiver 44 for receiving disturbance event messages and security key event messages from the VSUs 14 and for sending commands to the VSUs 14. When receiving an event message, the processing unit 46 determines the proper action to be undertaken. For example, when receiving a disturbance event, it waits for a key reading event. If a key reading event is received, the processing unit 46 validates the security key identification code and sends a command to the proper VSU 14 for going into the disarmed mode or into the maintenance mode, depending on the security level associated with the security key identification code, as will be discussed further below. If no key reading event is received after the given deactivation time period, the processing unit 46 activates an alarm flag.

Using an alarm output 48, the alarm flag is transmitted to a central monitoring station and/or to an intercommunication system, an alarm siren or a pager in order to alert the appropriate person in charge or the security guard.

The master unit 16 also typically comprises a listing database (not shown) for associating each vehicle to a unique vehicle identification code and each security key identification code to a unique authorized user, and a logging database (not shown) for storing each event received for each vehicle 12. The stored data includes the time at which the event occurred, the vehicle identification code, the type of event, the security key identification code in case of a key reading event, etc. Accordingly, using this database, it is possible to retrieve all the events associated with a specific vehicle. If a vehicle is missing, for example, it will be possible to retrieve the last authorized person that accessed the vehicle.

Figure 4:
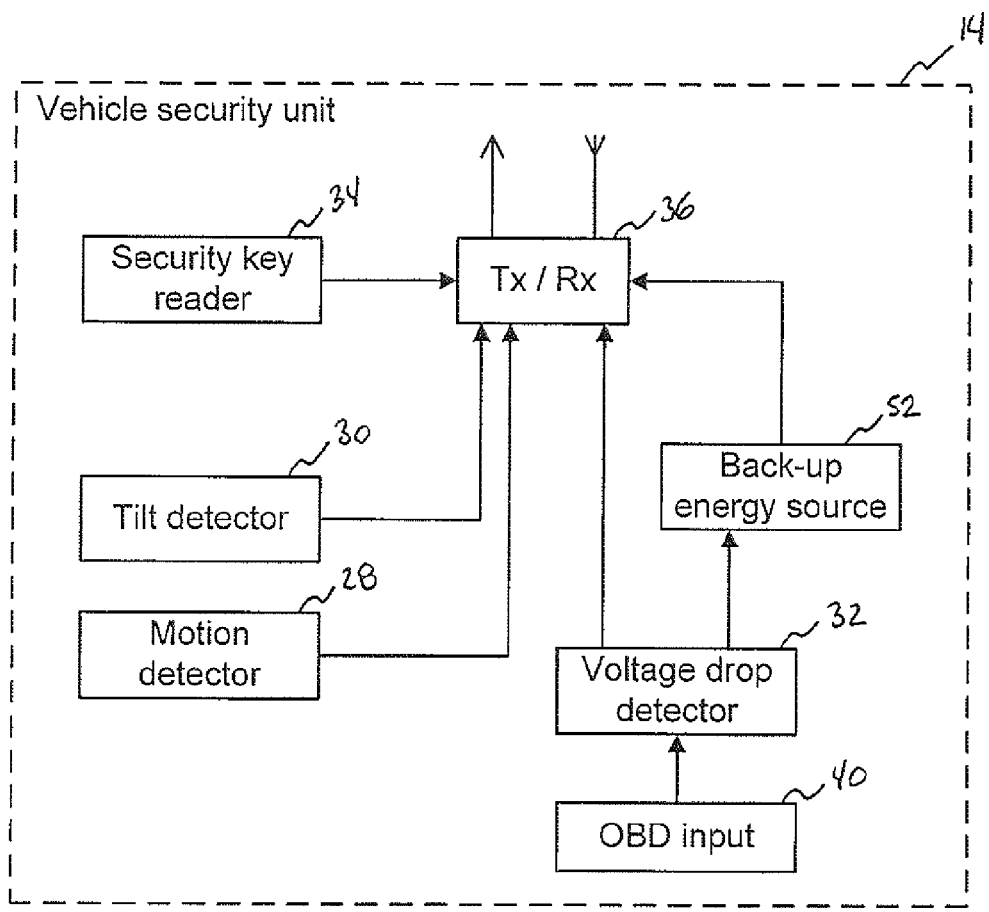
FIG. 4 is a block diagram of the VSU wherein the disturbance detector is exploded.

FIG. 4 shows the VSU 14 in more details. The disturbance detector comprises a motion detector 28 for detecting an intrusion in the vehicle 12, a tilt detector 30 for detecting an attempt to lift the vehicle, for example, and a voltage drop detector 32 for detecting an ignition of the car or an attempt to power off the VSU 14. A disturbance event provided by the motion detector 28 is generally a low level disturbance event while a disturbance event provided by the tilt detector 28 is generally a high level disturbance event. The voltage drop detector 32 detects a sudden drop of voltage. A drop associated with a power off is a high level disturbance event. The tilt detector 28 detects a tilt exceeding a threshold, three degrees for example, about any of the four axis of the vehicle. The VSU 14 is powered by the battery of the vehicle through the OBD input 40 but it also comprises an energy back-up source 52, such as a capacitor, for providing a sufficient time of autonomy for transmitting the disturbance event in case the battery is disconnected The disturbance detector may also comprise other detectors such as a device for detecting an attempt to steel a wheel, an airbag, a navigation system.

Figure 5:
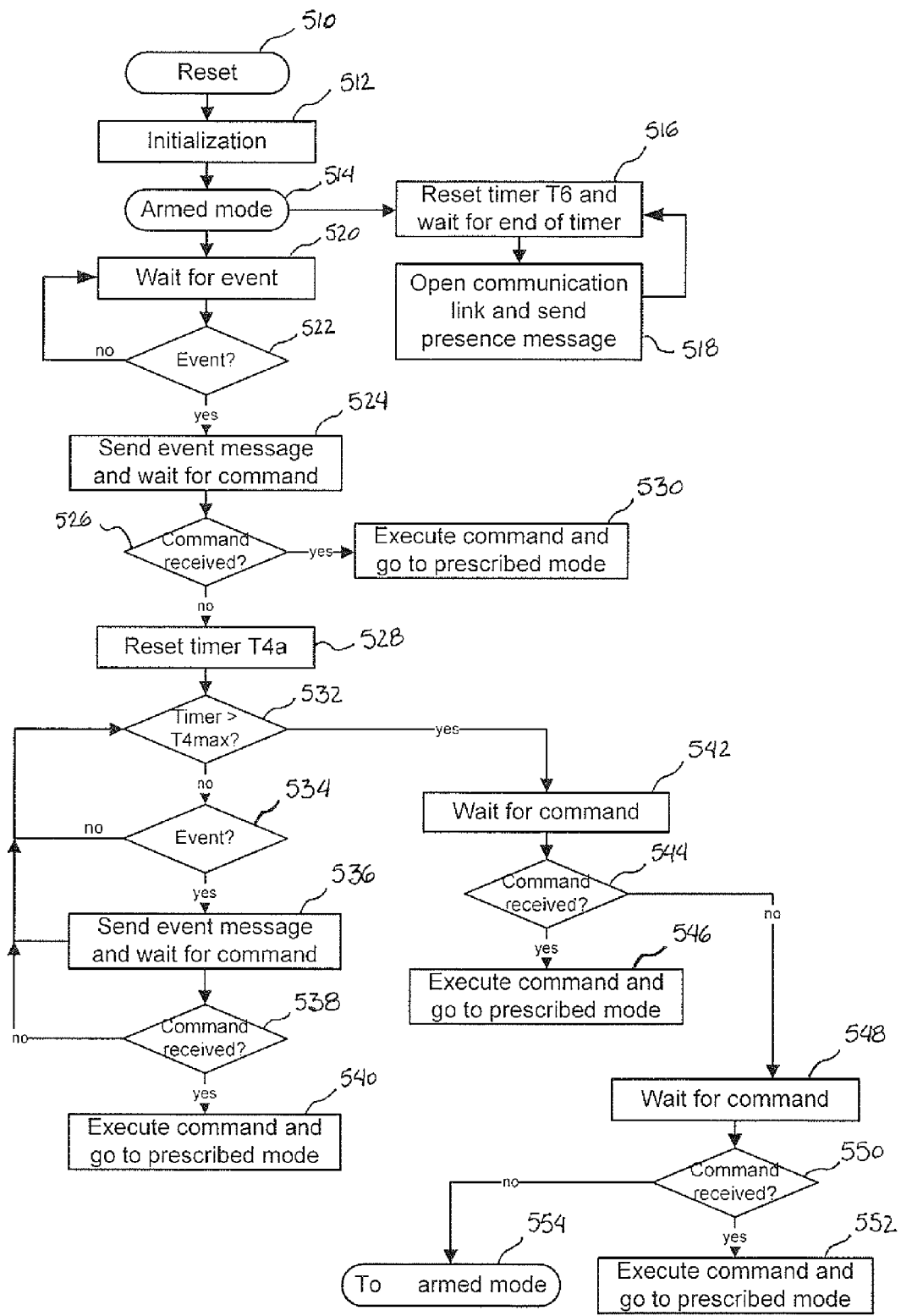
FIG. 5 is a flow chart illustrating the behavior of the VSU upon a reset.

The logic of the VSU comprises four modes of operations: a reset mode, an armed mode, a disarmed mode and a maintenance mode. FIG. 5 illustrates the reset mode and the armed mode. When a VSU is powered on, an initialization process 512 is conducted. Among other things, the tilt detector is initialized. The duration of the initialization process is fixed by a first timer, i.e. T1. When the initialization is completed the VSU goes into the armed mode 514. In the reset mode, it may be possible to detect key reading events.

In the armed mode, when a low level disturbance, such as motion detection, is detected by the VSU, a disturbance event message is automatically transmitted to the master unit. An authorized user than has a predetermined deactivation time period, typically thirteen seconds, to show its security key to the security key reader in order to deactivate the armed mode and prevent the alarm. If no valid key is shown, the master unit will activate an alarm flag. During business hours, the alarm will activate an intercommunication system, an alarm siren or a pager to alert the administrator or a security guard that an infraction has occurred. Whenever an intrusion occurs off the business hours, an alarm is automatically transmitted to a central monitoring station which will apply the predetermined official arrangements provided by the owner of the fleet.

Whenever a high level disturbance, such as a disconnecting of the VSU or the car battery (detected by the voltage drop detector) or tilt detection, occurs in the armed or in the disarmed mode, an alarm is automatically set by the master unit.

Accordingly, the VSU waits for a disturbance event or a key reading event in 520. At 522, if no event is received, the VSU continues to wait (in 520) and if an event is received, in 524, a corresponding event message is sent and the communication link is opened to wait for a command. In 526, if a command is received from the master unit; in 530, the VSU executes the command and goes to the prescribed mode. A timer T4a is then reset in 528. Timer T4a manages the deactivation time period during which no alarm flag is set to provide a deactivation time for the potentially authorized user to show its security key. If no command is received; in 532, it is checked whether the deactivation time (T4a) has lapsed. At 534, if the deactivation time has not lapsed and an event is received; in step 536, the VSU sends a corresponding event message and opens the communication link with the master unit to wait for a command. In 538, if a command is received from the master unit; in 540, the VSU executes the command and goes to the mode prescribed by the command. If no command is received, the VSU continues to wait for the end of timer T4a in 532.

In 532, if the deactivation time has lapsed, either no security key has been shown or the security key shown was invalid. The VSU then waits for the next command from the master unit in 542. At this time, a command to activate the alarm indicator 42 (see FIG. 2), for example, can be received, but the VSU takes no action until it receives the appropriate command from the master unit. In 544, if no command is received; in 548, the VSU tries again to communicate with the master unit. In 550, if a command is received; the VSU executes that command in 552. If still no command is received, in 554, the VSU is most probably out of the zone covered by the master unit (out of range), i.e. an authorized user is currently out with the vehicle, and no command can be received from the master unit. In this case, the VSU should stop sending event messages over and over in order to save electrical energy. Accordingly, in 554, it goes back to the beginning of the armed mode.

Furthermore, during the armed mode 514 and in parallel to steps 520 to 554, a timer T6 is used in managing the transmission of presence messages to the master unit for inventory purposes. In step 516, timer T6 is reset and the VSU waits until the end of the duration of T6. Timer T6 typically lasts five minutes but the duration of T6 may be reprogrammed by the master unit. At the end of the duration of T6, step 518, the VSU opens the communication link with the master unit and sends a presence message. It then goes back to step 516.

It is noted that a case where the vehicle is out with an authorized user and the armed mode is activated can arise in a particular circumstance wherein the authorized user has parked the vehicle for a short period of time, for having a lunch in a restaurant for example. The VSU automatically resets after thirty seconds of inactivity (defined by timer T3), as will be discussed further below, and then goes into the armed mode. As the VSU should rather be in the disarmed mode, if communication with the master unit is lost, it goes back in that mode. Alternatively, the VSU may have an out-of-range mode wherein it stops to send event messages but still try to communicate with the master unit each five minutes or so, i.e. as prescribed by timer T6.

It is contemplated that the VSU is a slave responding to the master unit and that the VSU takes no action and makes no decision. It only listens to commands received by the master unit. The master unit only decides that a valid key has been read and that the VSU should go into the disarmed or the maintenance mode.

It is noted that the VSU only opens the communication link between the VSU and the master unit. It opens the communication link, i.e. it sends an open link message to the master units and waits for a command, only at given prescribed times. The VSU opens the communication link every five minutes (or any other time prescribed by timer T6), at the time it sends a presence message (step 518). It also opens the communication link each time an event message is being sent (steps 524, 536, 542 and 548).

Figure 6:
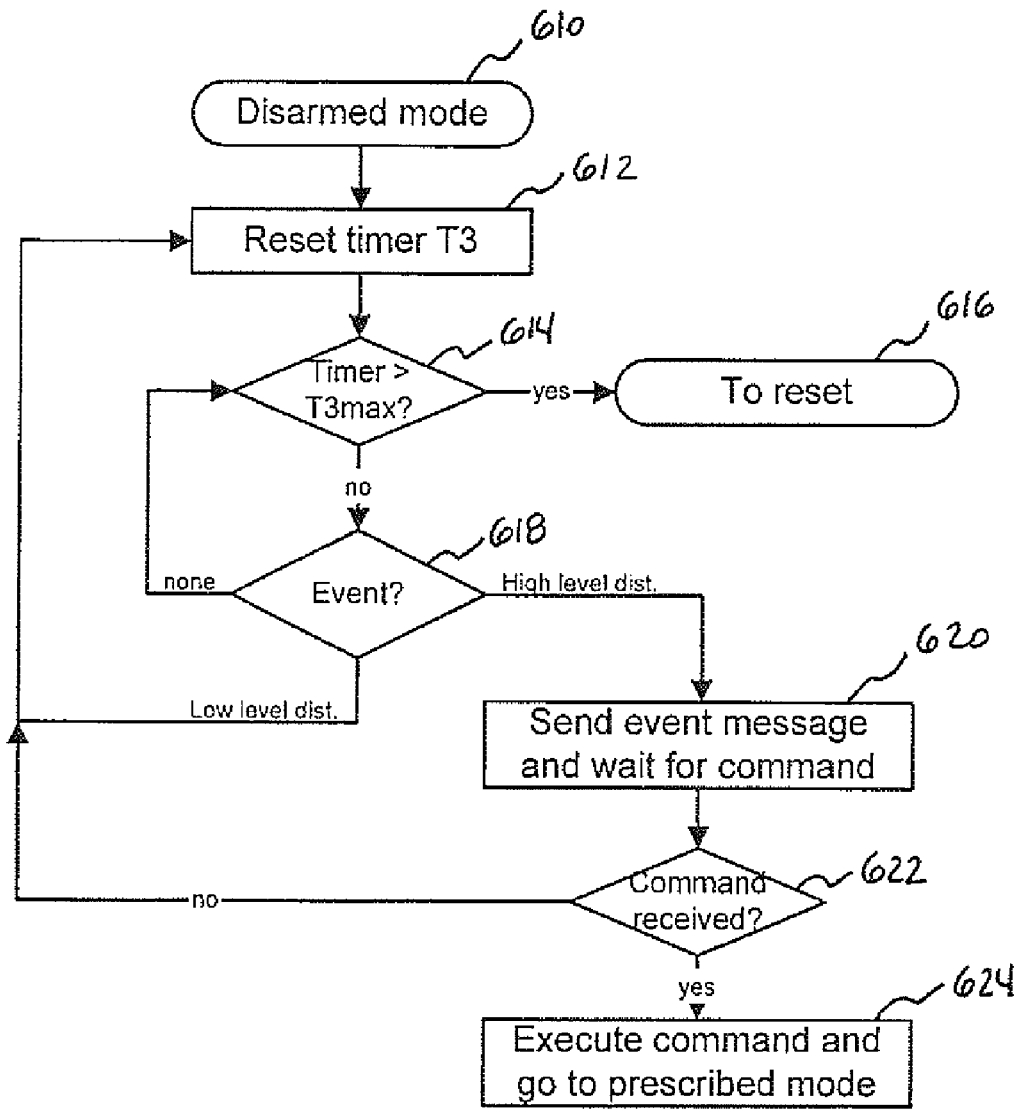
FIG. 6 is a flow chart illustrating the behavior of the VSU in a disarmed mode.

FIG. 6 illustrates the disarmed mode of the VSU. This mode allows an authorized user to use the vehicle and exit the parking lot, for a car trial with a potential buyer for example, or to go in the car to get any object left in the vehicle. The VSU typically goes into the disarmed mode on a command from the master unit. When the master unit determines that a valid security key has been presented to the security key reader, it sends a command to the VSU to go in the disarmed mode. When in disarmed mode, the VSU stops sending event messages to the master unit in response to low level disturbance events. However, if a high level disturbance event occurs, an event message is sent accordingly. In order to provide a condition for rearming the security system when an authorized user returns the vehicle to the parking lot, the VSU automatically resets after thirty seconds of inactivity, i.e. the activation time period prescribed by a timer T3. More specifically, if no disturbance event and no key reading event arises for thirty seconds, the VSU automatically goes into the reset mode.

Accordingly, the disarmed mode starts in step 610. In 612, timer T3 is reset. In 614, if timer T3 has lapsed, i.e. no event occurred for thirty seconds, the VSU resets, in 616. As described along with FIG. 5, the VSU will then go in the armed mode. If, in 614, timer T3 has not lapsed; in 618, if no event arises, the VSU still waits for timer T3 to lapse in 614. A low level disturbance event resets timer T3 in 612. If a high level disturbance event occurs, in 620, the VSU sends an event message to the master unit and opens the communication link to wait for a command. In 622, if a command is received; in 624, the command is executed and the VSU then goes in the mode prescribed by the command. If, in 622, no command is received; in 612, timer T3 is reset and the disarmed mode goes on.

Figure 7:
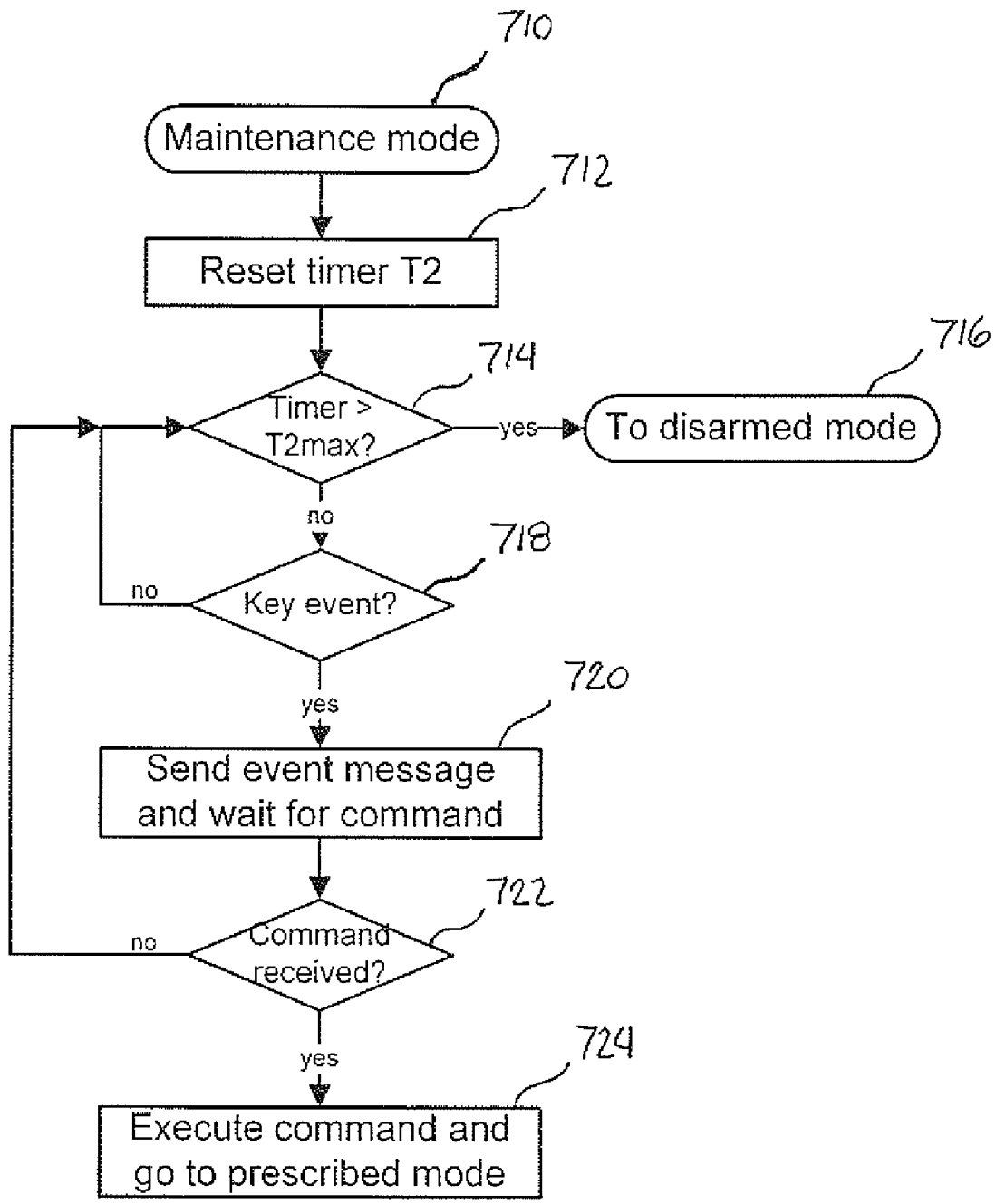
FIG. 7 is a flow chart illustrating the behavior of the VSU in a maintenance mode.

FIG. 7 illustrates the maintenance mode of the VSU. The maintenance mode allows a technician to do maintenance and repair activities on the vehicle. This mode allows a technician to remove the battery from the vehicle, to replace it for example, or to disconnect the VSU without initiating an alarm. Furthermore, in opposition with the disarmed mode, the VSU will not be rearmed after thirty seconds of inactivity. It will rather be rearmed automatically after one hour (provided by a timer T2) and thereby provides the technician with one hour for doing the task to be done. The maintenance mode is activated by showing an appropriate security key to the security key reader while the VSU is in the armed mode. Accordingly, there are two levels of security keys, technician security keys and authorized user security keys. When a security key is shown to the VSU, the master unit receives the key identification code and, according to the code received, it determines which mode should be activated. When in maintenance mode, the technician can reactivate the armed mode by showing its security key to the security key reader. The master unit then commands the VSU to go to the disarmed mode and the armed mode will be reactivated after thirty seconds of inactivity.

Accordingly, the maintenance mode starts in step 710. In 712, timer T2, which defines the inactivity time period before the VSU is to be rearmed, is reset. In 714, if timer T2 has lapsed; the VSU goes into the disarmed mode (see FIG. 6) in 716 and will consequently wait for another thirty seconds of inactivity (as prescribed by timer T3) before it resets and then goes into the armed mode. If, in 714, timer T2 has not lapsed; the timer will go on until a key event occurs. In 718, if a key event occurs; in 720, the VSU send a key reading event message according to the key read and then waits for a command from the master unit. In 722, if a command is received; in 724, it is executed and the VSU goes into the mode prescribed by the command. In 722, if no command is received, the maintenance mode goes on. It is noted that, in 716, the VSU could rather go into the reset mode.

Figure 8:
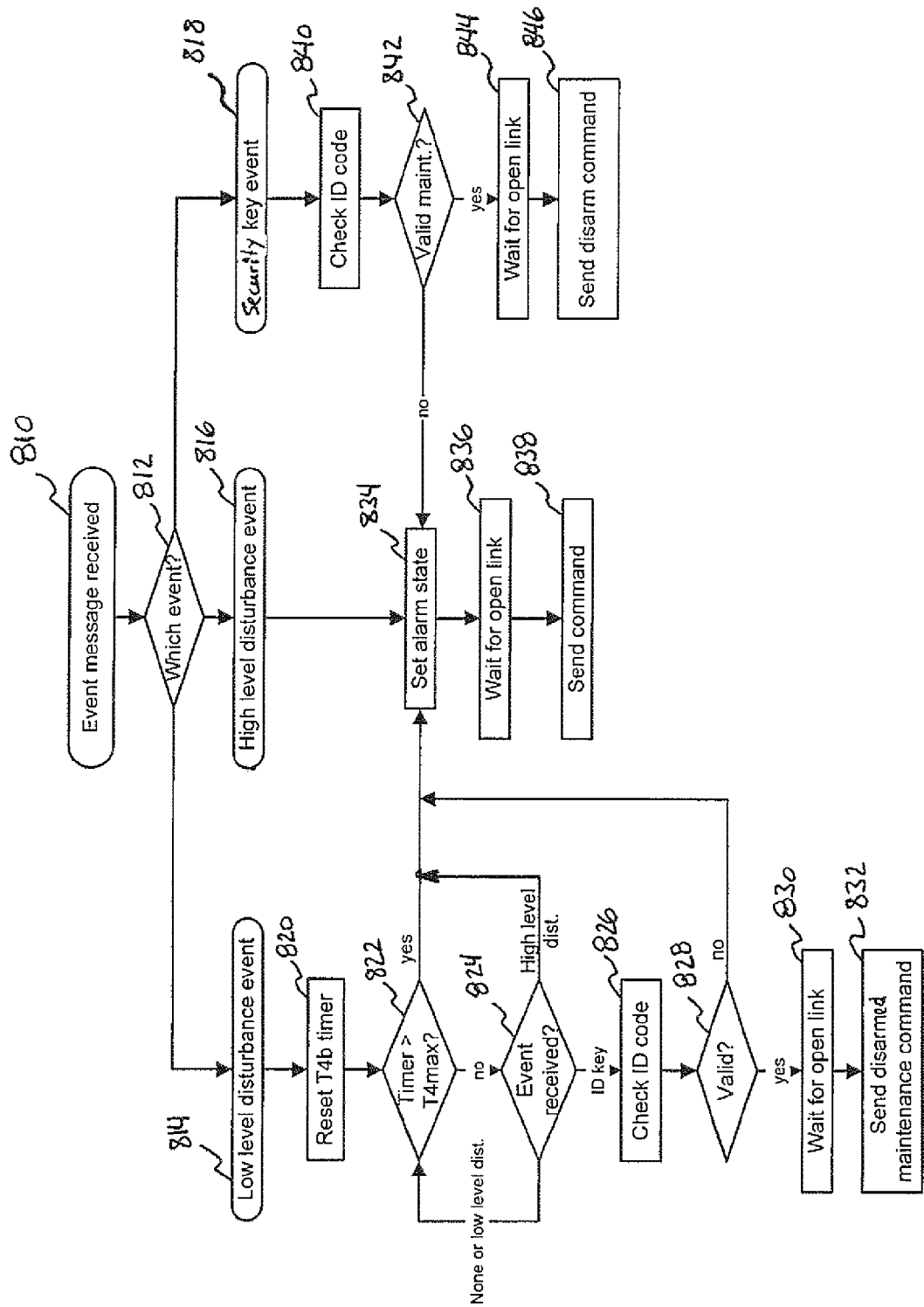
FIG. 8 is a flow chart illustrating the behavior of the master unit upon receiving of an event message from a VSU.

The master unit receives event messages, i.e. disturbance event messages and key reading messages, or presence messages from the VSUs. Each time a message is received, the appropriate action is undertaken. FIG. 8 illustrates the behavior of the master unit as an event message is received, in step 810, from one of the VSUs. In 812, the appropriate steps are undertaken depending on the nature of the event message received, i.e. a low level disturbance event, 814, a high level disturbance event, 816, or a security key event, 818.

If the event is a low level disturbance event message, such as a motion detection event message, the master unit waits for a security key event message for a given deactivation time period prescribed by timer T4b. This time period corresponds to timer T4a of the VSUs, i.e. thirteen seconds. If no valid security key is shown, an alarm flag is set. Accordingly, in step 820, timer T4b is reset. In 822, if timer T4b has lapsed, i.e. no security key was shown to the VSU and the deactivation time has lapsed, an alarm flag is set in 834. Otherwise, the master unit waits for a security key event message in 824. If a low level event message is received during that time, nothing is done and the master unit continues to wait for the security key event message. However, if a high level event message, such as a tilt event message or a voltage drop event message, is received during that time, an alarm is automatically set in 834. Hopefully, in 824, a security key message is received and the master unit validates the key identification code in its database in 826. In 828, if the code happens to be invalid, an alarm flag is set in 834. If the code is valid, it can be associated with a normal authorized user or to a technician. In 830, the master unit waits for a communication link to be established with the given VSU, since, as described hereinabove, communications between the VSU and the master unit is to be initiated by the VSU. In 832, the appropriate command is sent to the VSU depending on the code read, i.e. if the code is associated with a normal authorized user, the command prescribes the disarmed mode but if the code is associated with a technician, the command prescribes the maintenance mode to the VSU.

Whenever a high level disturbance event message is received, 816, an alarm flag is set in 834. The alarm flag typically activates an alarm siren, an intercommunication system, a pager or a central monitoring station as described hereinabove. In 836, the master unit also waits for the communication link to be established with the given VSU in order to, in 838, send a command to the VSU to activate its alarm indicator. The master unit may also display on a screen the type of event that generated the alarm along with data regarding the associated vehicle such as its model, its color and its location in the parking lot.

The master unit may also be connected to a network of video cameras covering the parking lot. The location of the vehicle associated with the alarm may be found using a local positioning system installed in the VSU for example or, if the vehicle is to be parked at a specific position in the parking lot, the location can be retrieved from a database. The video camera covering the zone in which the vehicle is located may then be selected and the video image provided by the camera be displayed on a screen.

As discussed hereinabove, when the VSU is in maintenance mode, the technician may activate the armed mode by showing its security key to the VSU. Accordingly, in 818, if a security key event message is received, the master unit validates the key identification code in 840. In 842, if the code is a valid technician code; in 844, the master unit waits for the communication link to be established with the given VSU in order to, in 846, send a command to the VSU prescribing the disarmed mode. If, in 842, the code is not a valid technician code, an alarm flag is set in 834.

Figure 9:
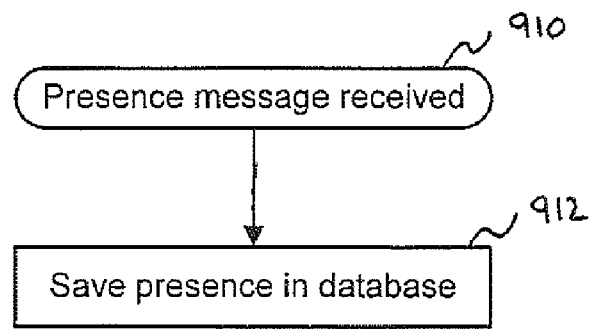
FIG. 9 is a flow chart illustrating the behavior of the master unit upon receiving a presence message from a VSU.

FIG. 9 illustrates the behavior of the master unit as a presence message is received from one of the VSUs. When a presence message is received in 910, the presence is recorded in a database in 912. The time at which the message is received and the vehicle identification code are saved in the database. The master unit thus keeps track of the vehicles present in the parking lot.

Figure 10:
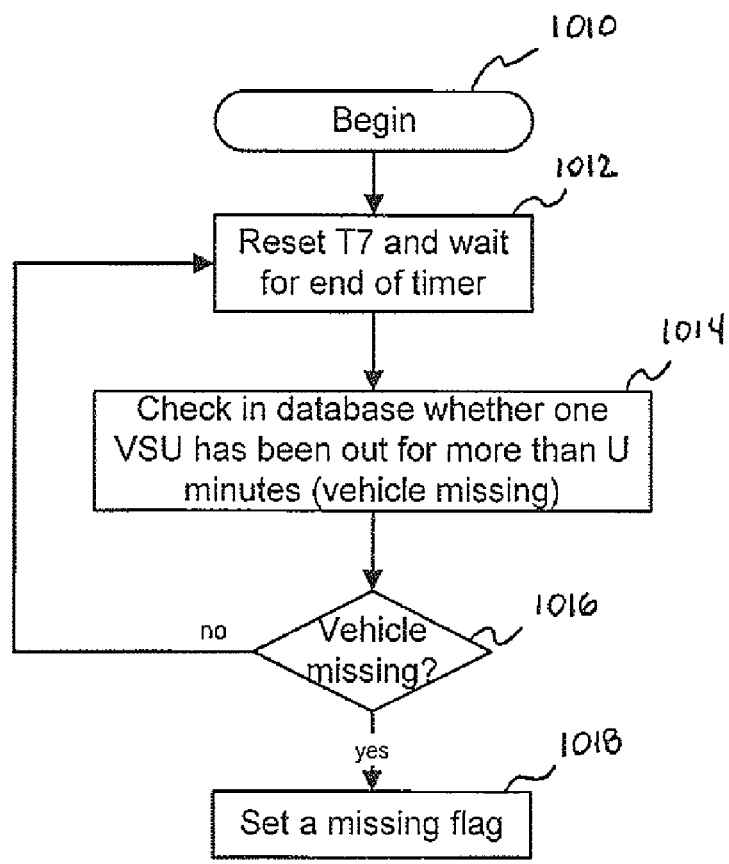
FIG. 10 is a flow chart illustrating the inventory check performed by the master unit.

FIG. 10 illustrates how the master units checks for missing vehicle periodically so that, if a vehicle is out for a period of time that exceeds the allowable missing time period (typically one hour), a missing warning is set to alert the appropriate person in charge, the security guard or any suitable authority. Accordingly, while the master unit waits for event messages, it also performs, in parallel, an inventory check every five minutes, provided by a timer T7. The process begins in 1010. In 1012, the master unit waits for the missing time period prescribed by T7, i.e. five minutes. In 1014, it then checks in the database whether one of the VSU has been out, i.e. no presence message has been received, in more than the allowable missing time period (one hour). In 1016, if no vehicle is missing; in 1012, the master unit waits another five minutes before doing the check again. If one vehicle of the fleet is missing; in 1018, a warning flag is set.

It is noted that the flow chart provided in FIG. 5 to 10 have been simplified for ease of illustration and that some features of the system that can be present or not are not illustrated. For example, each time an alarm flag or a warning flag is set, the flag is recorded into a database and the master unit undertakes the suitable action to communicate the flag and the appropriate information about the event that generated the flag, to the appropriate authority.

For example, if an event is generated by the voltage drop detector, the event may either be a high level voltage drop, i.e. the VSU has been disconnected, or a low level voltage drop, i.e. the battery level is decreasing below a predetermined level. The first case automatically generates an alarm flag, which, if it occurs off the business hours, is communicated to the central monitoring system. The second case rather generates a low battery level warning and no alarm flag is to be communicated to the central monitoring system. This feature is used to monitor the battery level of each vehicle and to detect a low battery level. If a low battery level event is generated, a low battery level warning is recorded by the central monitoring system, which indicates to a vehicle fleet manager that an action should be undertaken soon in order to avoid a situation where the battery reaches a level that is critically low. Furthermore, each time an alarm flag is communicated to the central monitoring system, information about the event that generated the alarm is also communicated and different actions may be carried on depending on the type of events.

Furthermore, the database keeps a history of all events occurring with respect to each vehicle. The master unit is thus able to generate a warning if a specific vehicle has been taken for use by an authorized user but the vehicle has now been out for a long period of time (more than one day for example). The vehicle is then considered as being missing. A warning then appears on the master unit interface. The administrator may also be contacted.

While illustrated in the block diagrams as groups of discrete components communicating with each other via distinct data signal connections, it will be understood by those skilled in the art that the preferred embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

The embodiments of the invention described above are intended to be exemplary only. The scope of the invention is therefore intended to be limited solely by the scope of the appended claims.

What is claimed is:

1. A vehicle security unit for installation inside a vehicle of a fleet of vehicles and in wireless communication with a master unit, said vehicle being associated with a vehicle identification code, the vehicle security unit comprising:
    an armed mode to be active or inactive;
    a disturbance event detection system for detecting a disturbance event and a type of disturbance associated with said vehicle;
    a security key reader for reading a security key, and for producing a security key reading event in response to the reading, said security key having a key identification code;
    a vehicle transmitter for transmitting a disturbance event message comprising said type of disturbance to said master unit in response to said disturbance event if said security mode is active and for transmitting a security key reading event message to said master unit in response to said security key reading event, said disturbance event message and said security key event message comprising said vehicle identification code and said security key event message comprising said key identification code;
    a receiver for receiving a command from said master unit to deactivate said armed mode; and
    an on-board diagnostic connector and a battery wherein said vehicle security unit has an on-board diagnostic input to be connected to said on-board diagnostic connector for detecting at least a voltage drop event in said battery, said disturbance event message comprising said voltage drop event.

2. The security system as claimed in claim 1, wherein said on-board diagnostic input is further for powering said vehicle security unit using said battery.

3. The security system as claimed in claim 1, wherein said vehicle security unit is installed in the passenger compartment of said vehicle and wherein said vehicle security unit is electrically connected to said vehicle using only said on-board diagnostic connector.

4. A security system for a fleet of vehicles said security system comprising:
    a vehicle security unit for installation inside a passenger compartment of at least one of said vehicles, each one of said vehicles being associated with a vehicle identification code, each vehicle security unit comprising:
    an armed mode to be active or inactive;
    a disturbance event detection system for detecting a disturbance event and a type of disturbance associated with said vehicle;
    a security key reader for reading a security key, and for producing a security key reading event in response to the reading, said security key having a key identification code;
    a vehicle transceiver for transmitting a disturbance event message comprising said type of disturbance in response to said disturbance event if said security mode is active and for transmitting a security key event message in response to said security key reading event, said disturbance event message and said security key event message comprising said vehicle identification code and said security key event message comprising said key identification, and for receiving a command to deactivate said armed mode;
    a master unit in wireless communication with said vehicle security unit, said master unit having comprising:
    a master unit transceiver for receiving said disturbance event message and said security key event message, and for sending said command to said vehicle security unit;
    a processing module in communication with said master transceiver and for validating said security key identification code when receiving a security key event message,
    for determining said command to deactivate said armed mode if said identification code is valid, said command to be sent using said master transceiver, and
    for activating an alarm flag when receiving said disturbance event message a predetermined deactivation time period following the receiving if said armed mode is active; and
    wherein said vehicle has an onboard diagnostic connector and a battery wherein said vehicle security unit has an on-board diagnostic input to be connected to said on-board diagnostic connector for detecting at least a voltage drop event in said battery, said disturbance event comprising said voltage drop event.

5. The security system as claimed in claim 4, wherein said on-board diagnostic input is further for powering said vehicle security unit using said battery.

6. The security system as claimed in claim 4, wherein said master transceiver is further for transmitting an acknowledgement message to said vehicle security unit when receiving at least one of said disturbance event message and said security key event message and wherein said vehicle transceiver is further for receiving said acknowledgement message and for deactivating a message transmission mode when no acknowledgment message is received for a number of consecutive times.

7. A vehicle security unit for installation in a vehicle of a fleet of vehicles and in wireless communication with a master unit, said vehicle being associated with a vehicle identification code and having an on-board diagnostic connector and a battery, said vehicle security unit comprising:
    a disturbance event detection system for detecting a disturbance event associated with said vehicle and comprising an on-board diagnostic input to be connected to said on-board diagnostic connector for detecting at least a voltage drop event in said battery, said disturbance event comprising said voltage drop event;
    a security key reader for reading a security key, and for producing a security key reading event in response to the reading, said security key having a key identification code; and
    a vehicle transmitter for transmitting a disturbance event message to said master unit in response to said disturbance event and for transmitting a security key event message to said master unit in response to said security key reading event, said disturbance event message and said security key event message comprising said vehicle identification code and said security key event message comprising said key identification.

8. The security system as claimed in claim 7, wherein said on-board diagnostic input is further for powering said vehicle security unit using said battery.

* * * * *